(12) United States Patent
Senoo et al.

(10) Patent No.: US 7,096,284 B2
(45) Date of Patent: Aug. 22, 2006

(54) RECEIVING DEVICE CONNECTED TO IEEE1394 SERIAL BUS

(75) Inventors: Junya Senoo, Daito (JP); Takeshi Nakata, Daito (JP)

(73) Assignee: Funai Electric Co., Ltd., Daito (JP)

( * ) Notice: Subject to any disclaimer, the term of this patent is extended or adjusted under 35 U.S.C. 154(b) by 371 days.

(21) Appl. No.: 10/767,259

(22) Filed: Jan. 30, 2004

(65) Prior Publication Data

US 2004/0186940 A1    Sep. 23, 2004

(30) Foreign Application Priority Data

Jan. 31, 2003    (JP)    ............... 2003-023559

(51) Int. Cl.
*G06F 13/38*    (2006.01)
*H04L 12/28*    (2006.01)

(52) U.S. Cl. ........................... 710/62; 370/431
(58) Field of Classification Search ............ None
See application file for complete search history.

(56) References Cited

U.S. PATENT DOCUMENTS

| 5,511,169 | A | * | 4/1996 | Suda ......................... 710/100 |
| 5,535,208 | A | * | 7/1996 | Kawakami et al. ......... 370/391 |
| 5,689,244 | A | * | 11/1997 | Iijima et al. .................. 340/3.9 |
| 6,629,173 | B1 | * | 9/2003 | Iijima ......................... 710/107 |
| 6,721,831 | B1 | * | 4/2004 | Lee ............................. 710/107 |
| 6,831,899 | B1 | * | 12/2004 | Roy ............................. 370/260 |

FOREIGN PATENT DOCUMENTS

| JP | 2001-136185 | 5/2001 |
| JP | 2001-168886 A | 6/2001 |
| JP | 2001-175592 | 6/2001 |
| JP | 2002-33739 A | 1/2002 |

OTHER PUBLICATIONS

Sony Corporation, "High-Speed Digital Interface, IEEE 1394, Application to Audio and Video Devices", Japan, The Nikkan Kogyo Shimbun Ltds., Jan. 28, 2000, pp. 73-74.

* cited by examiner

*Primary Examiner*—Fritz Fleming
*Assistant Examiner*—Richard B. Franklin, Jr.
(74) *Attorney, Agent, or Firm*—Crowell & Moring LLP (57) ABSTRACT

The processor of a receiving device does not execute acquisition and release of resources of a band and a channel for the isochronous data transfer every time the processor receives data from the sending device by isochronous transfer, but executes the acquisition of the resources of the band and the channel for the isochronous data transfer via the bus and an I/F board only when the completion of a bus reset is detected and holds the resources until the next bus reset is caused. By this processing, the receiving device can consistently secure the resources necessary for the isochronous data transfer to the sending device so long as the resources acquisition is successfully achieved when the bus reset is completed. This therefore enables the prevention of the occurrence of a situation in which the receiving device becomes unable to receive the data from the sending device by the isochronous transfer due to a resource shortage caused by having failed in releasing the resources when the receiving device stopped the isochronous data transfer previously.

8 Claims, 8 Drawing Sheets

RECEIVING DEVICE CONNECTED TO IEEE1394 SERIAL BUS

BACKGROUND OF THE INVENTION

1. Field of the Invention

The present invention relates to devices connected to an IEEE1394 serial bus via an IEEE1394 digital interface board, and in particular, to a receiving device such as a printer, which consistently establishes a point-to-point connection with a sending device on the bus and receives data from the sending device by isochronous transfer.

2. Description of the Related Art

Conventionally, a receiving device such as a printer, which consistently establishes a point-to-point connection with a sending device on an IEEE1394 serial bus (hereinafter abbreviated to the bus) and receives data from the sending device by isochronous transfer, exists among the devices connected to the bus. When transmitting data to this kind of receiving device, the sending device normally executes the acquisition and release of the resources of a band and so forth for the isochronous data transfer at the time of starting and stopping isochronous data transfer.

Figure 7:
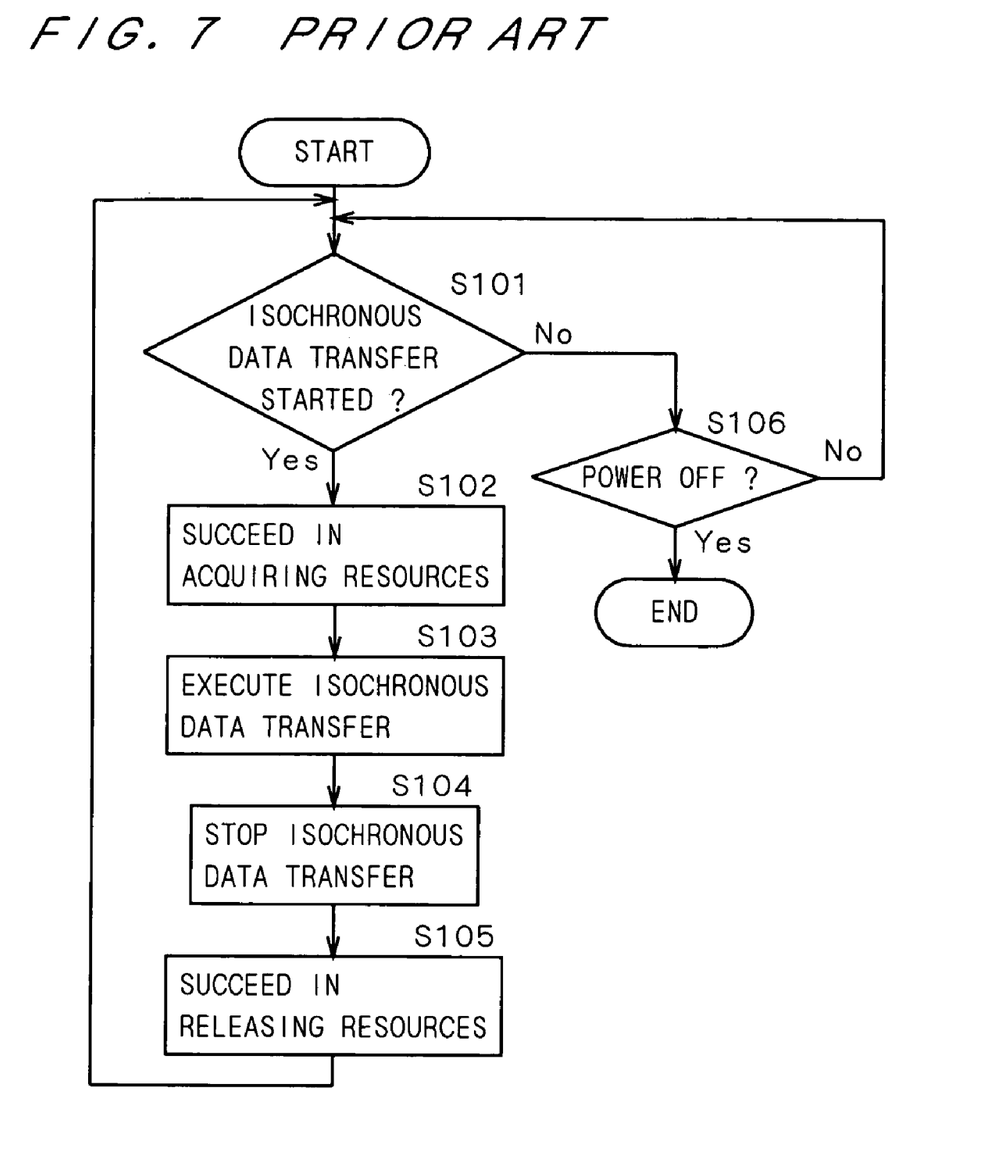
FIG. 7 is a flow chart showing resources acquisition processing and resources release processing in a conventional device connected to an IEEE1394 serial bus.

Next, resources acquisition processing and resources release processing by the sending device will be described with reference to FIG. 7. When executing the isochronous data transfer with the receiving device such as a printer connected by the point-to-point connection, the sending device acquires resources of a band and a channel for the isochronous data transfer when starting the isochronous data transfer to the receiving device (YES at S101) and executes the actual isochronous data transfer (S103) after the above resources acquisition is successfully achieved (S102). When stopping the isochronous data transfer (S104), the acquired resources are released. If the resources release is successfully achieved (S105), the sending device can reacquire the resources of the band and so forth for the isochronous data transfer when the isochronous data transfer from the sending device to the receiving device is restarted, and therefore, the isochronous data transfer can be correctly achieved.

Figure 8:
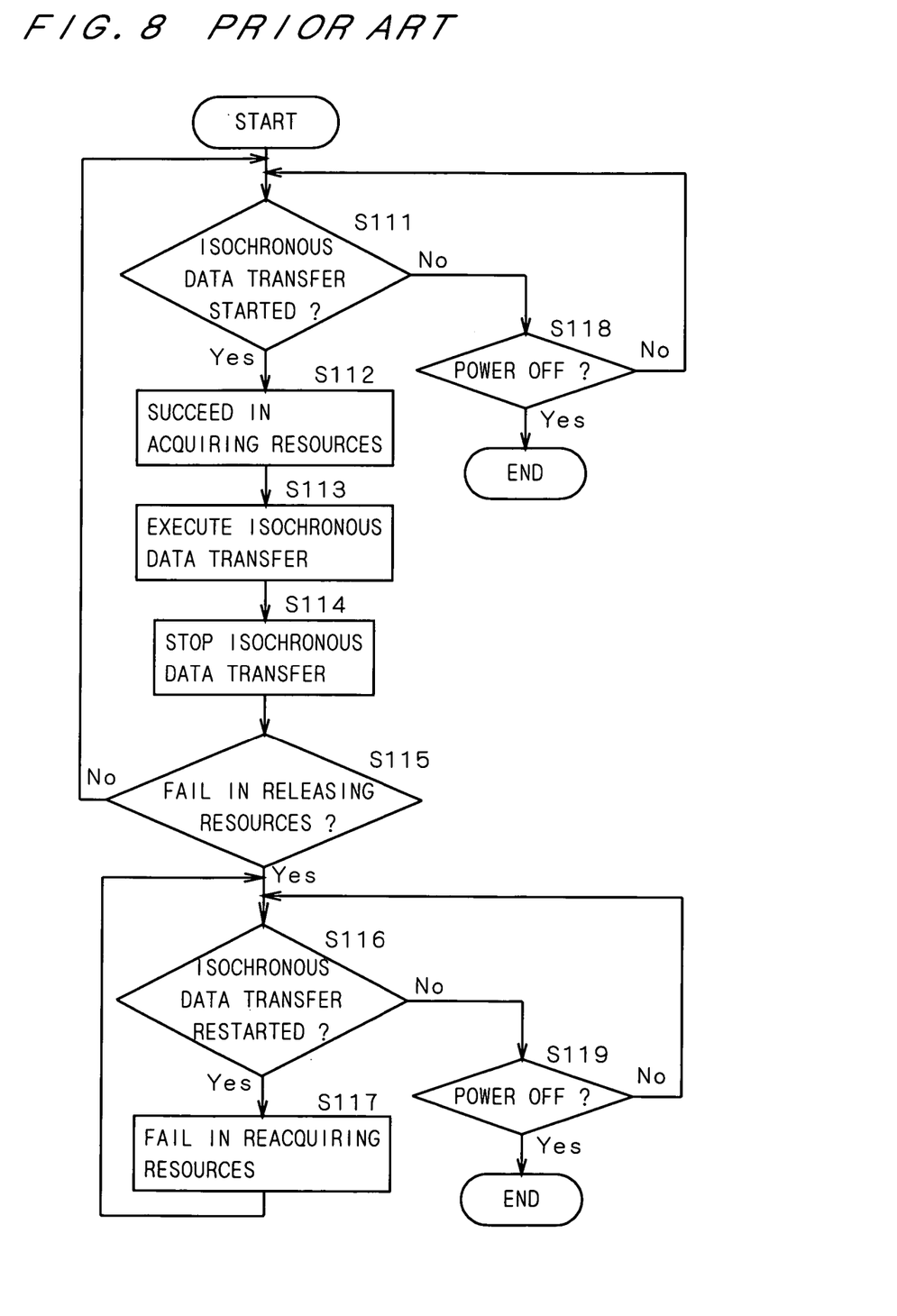
FIG. 8 is a flow chart showing processing in the case where the sending device fails in releasing the resources in the conventional device connected to the IEEE1394 serial bus.

However, according to the aforementioned conventional system in which the sending device executes the acquisition and release of the resources of the band and the channel for the isochronous data transfer every time the sending device executes the isochronous data transfer by the point-to-point connection, when the sending device fails in releasing the resources at the time of stopping the isochronous data transfer due to a bug of a program or the like as shown in FIG. 8 (YES at S115), some troubles mentioned below are possible to happen. To be concrete, at the time of restarting the isochronous data transfer to the receiving device (YES at S116), there is a possibility that the sending device cannot reacquire the band for the isochronous data transfer as a consequence of a shortage in the band, and a possibility that the sending device cannot reacquire the resources of an identical channel that the sending device released (S117). Accordingly, there is a possibility that the isochronous data transfer becomes unable to be executed between the sending device and the receiving device.

SUMMARY OF THE INVENTION

The object of the present invention is to provide a receiving device that is connected to an IEEE1394 serial and able to prevent data from a sending device from becoming unable to be received by the isochronous data transfer due to a failure in releasing the resources of a band and a channel for the isochronous data transfer when the isochronous data transfer is stopped.

A receiving device connected to an IEEE1394 serial bus in accordance with an aspect of the prevent invention comprises: an IEEE1394 digital interface board for transmitting and receiving data via the IEEE1394 serial bus; and a processor for controlling the IEEE1394 digital interface board.

The IEEE1394 digital interface board is able to receive data from a sending device connected by point-to-point connection by isochronous transfer.

Instead of acquiring resources of a band and a channel for isochronous data transfer every time the IEEE1394 digital interface board receives the data transmitted from the sending device by the isochronous transfer, the processor acquires the resources of the band and the channel for the isochronous data transfer via the IEEE1394 serial bus and the IEEE1394 digital interface board only when a bus reset is caused, and holds the resources until a next bus reset is caused.

By this operation, the receiving device can consistently secure the resources necessary for the isochronous data transfer with the sending device so long as the resources acquisition is successfully achieved when the bus reset is caused, and this therefore enables the prevention of the occurrence of a situation in which the receiving device becomes unable to receive the data by the isochronous transfer due to a resource shortage.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
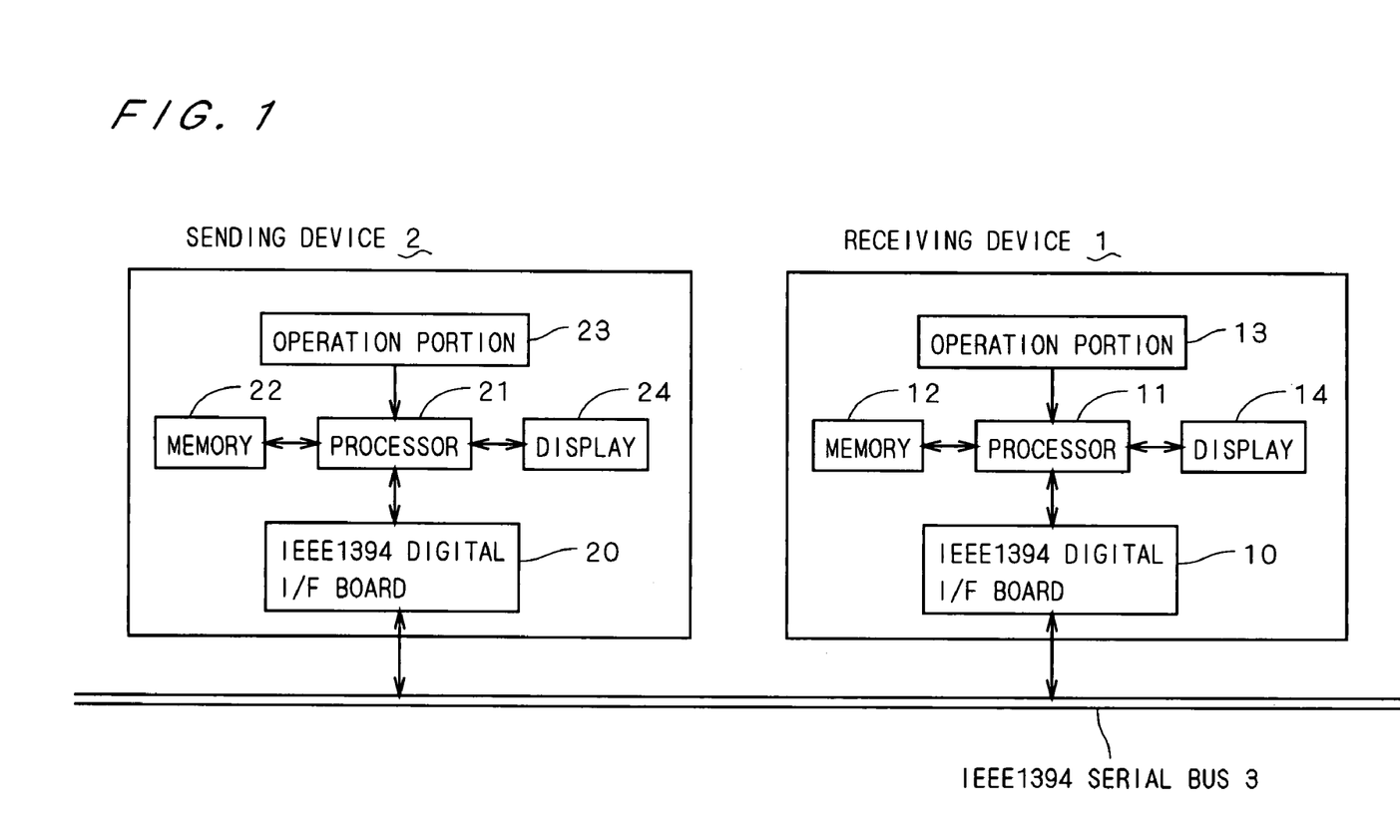
FIG. 1 is a schematic electric block diagram of a receiving device according to one embodiment of the present invention and a sending device corresponding to the receiving device.

A receiving device according to one embodiment that materializes the present invention will be described below with reference to the drawings. FIG. 1 is a schematic electric block diagram of the receiving device (receiving device connected to an IEEE1394 serial bus) according to the present embodiment and a sending device. This receiving device 1 is a device such as a printer, which consistently establishes a point-to-point connection with the sending device 2 on the IEEE1394 serial bus 3 (hereinafter abbreviated to the bus) and receives data from the sending device 2 by isochronous transfer.

The receiving device 1 has an IEEE1394 digital interface (I/F) board (hereinafter abbreviated to the I/F board) 10 for transmitting and receiving data of an image, letters and so forth via the bus 3, a processor 11 (the processor in the claims) for controlling the entire device including this I/F board 10, a memory 12 that stores various programs and so forth including driver software for the I/F board 10, an operation portion 13 for various kinds of operations and a display 14 for displaying various kinds of message information and so on. Moreover, the sending device 2 has an I/F board 20, a processor 21, a memory 22, an operation portion 23 and a display 24 similar to those of the receiving device 1.

Figure 2:
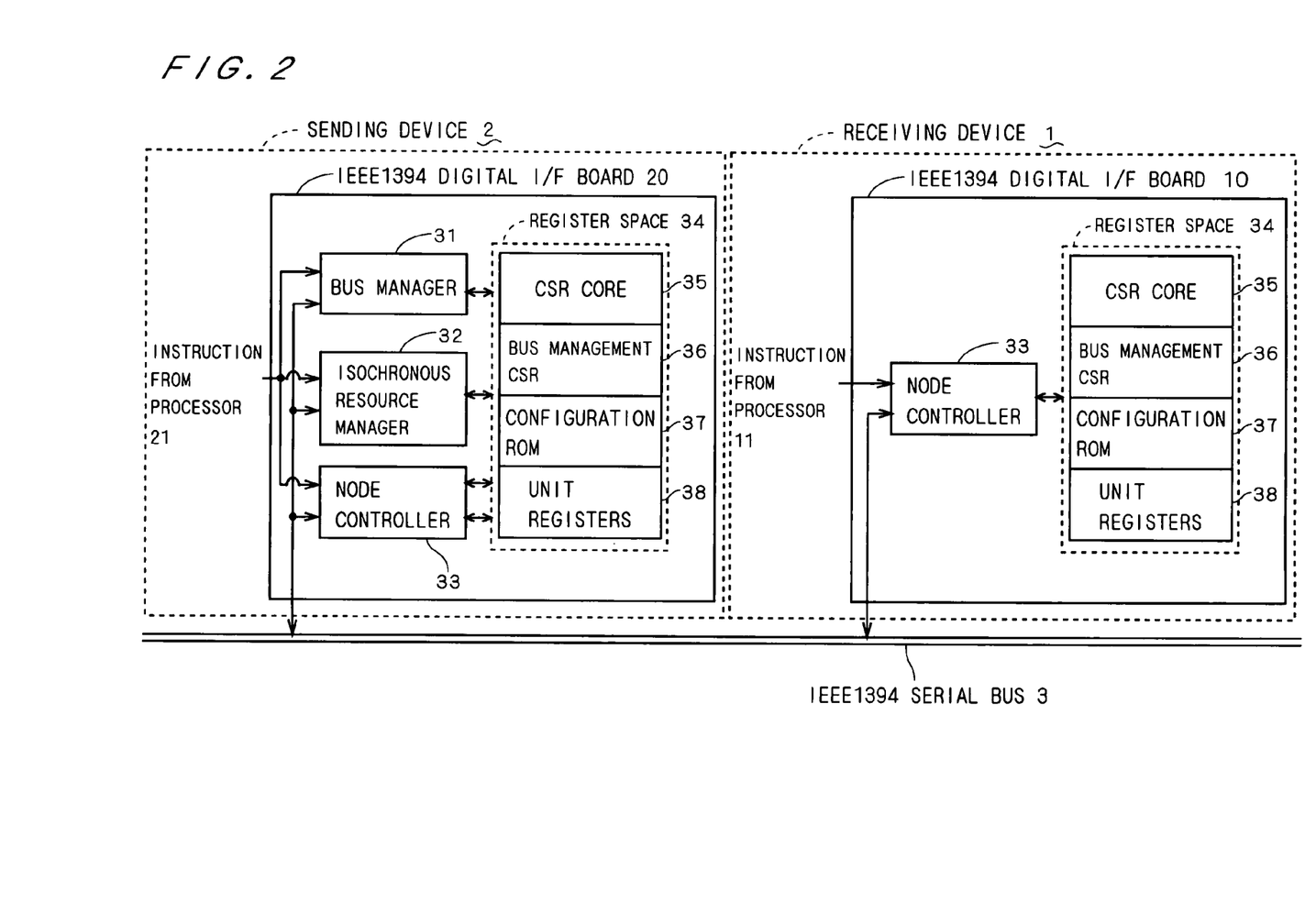
FIG. 2 is a schematic block diagram showing an example of the construction of functional blocks and a register space included in an I/F board in the above receiving device and the sending device.

FIG. 2 shows an example of the construction of functional blocks and a register space included in the I/F board 10 in the receiving device 1 and the I/F board 20 in the sending device 2. In this example, there is shown the construction in which the sending device 2 serves as a bus management node that manages other connected nodes on the bus 3 and concurrently as an isochronous resource management node that manages the band and the channel for the isochronous data transfer on the bus 3. The I/F board 20 of the sending device 2 has a bus manager 31 that performs the power management of the bus 3, provides a speedmap to memorize the information of the transfer rate between the devices on the bus 3 and provides a topology map to memorize the constructional information of the devices on the bus 3, an isochronous resource manager 32 that manages the band, the channel and so forth for the isochronous data transfer on the bus 3, and a node controller 33 for executing the control of the self node. Moreover, this I/F board 20 has a register space 34 constructed of a CSR (Control and Status Registers) core 35 used for controlling the self node, a bus management CSR 36 that is a register for the management of the bus 3, a configuration ROM 37 that memorizes the information of its own performance and so on and unit registers 38 that are the registers inherently possessed by individual devices.

In contrast to this, the I/F board 10 of the receiving device 1 has a node controller 33 and a register space 34 similar to the sending device 2, whereas it has neither the bus manager 31 nor the isochronous resource manager 32. That is, the receiving device 1 has no capability to become a bus management node and an isochronous resource management node on the bus 3.

Figure 3:
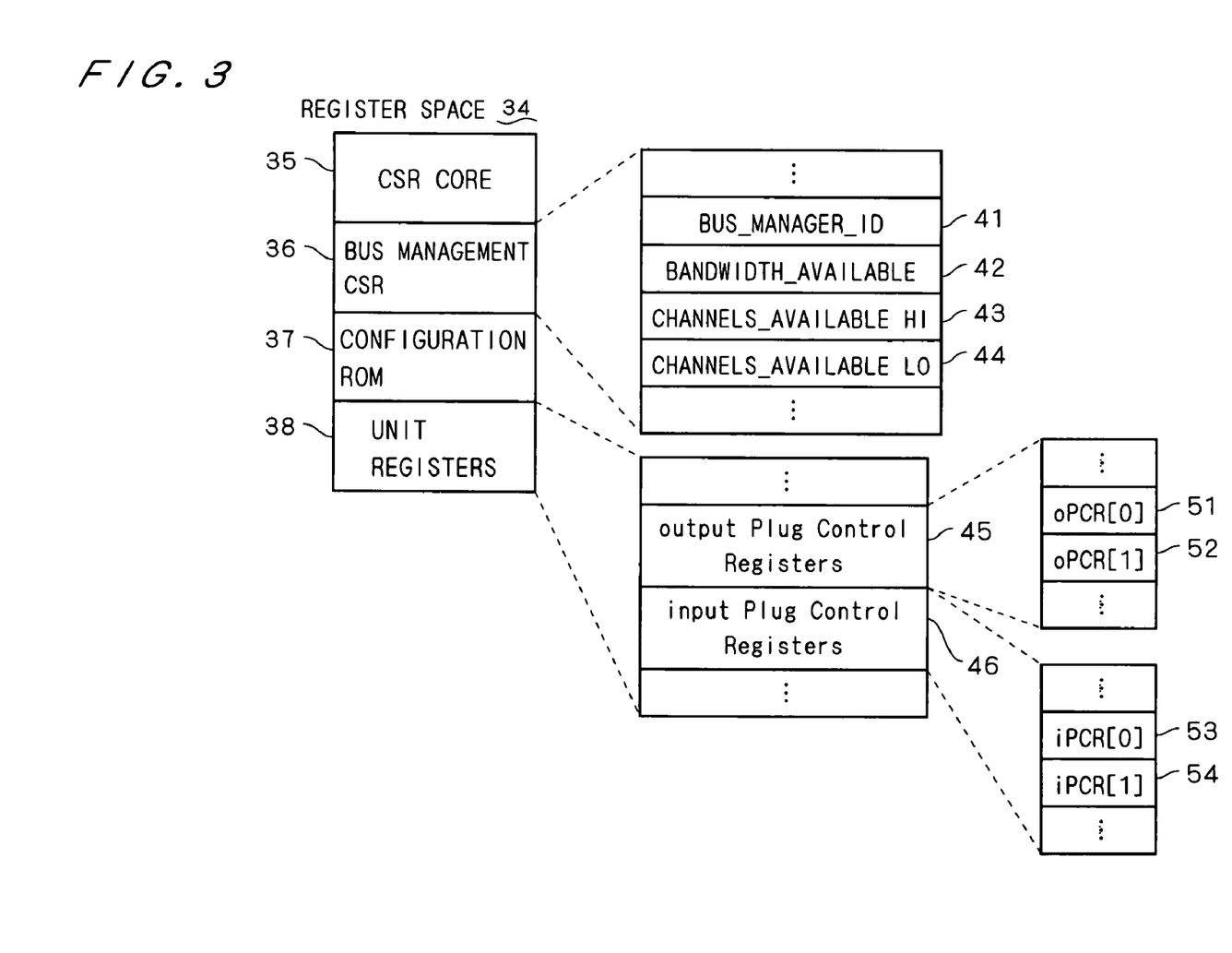
FIG. 3 is a diagram showing registers concerning resource management in the register space in FIG. 2.

The register concerning the resource management in the register space 34 will be described next with reference to FIG. 3. The bus management CSR 36 in the register space 34 includes a BUS_MANAGER_ID 41 that memorizes the node ID (identification) of the bus manager 31 shown in FIG. 2, a BANDWIDTH_AVAILABLE 42 that is a register for the management of the band for the isochronous data transfer and a CHANNELS_AVAILABLE HI 43 and a CHANNELS_AVAILABLE LO 44 that are registers for the channel management of the isochronous data transfer. Moreover, the unit registers 38 in the register space 34 include output Plug Control Registers (hereinafter abbreviated to oPCR) 45 that are registers for the connection management of the device on the data output side and input Plug Control Registers (hereinafter abbreviated to iPCR) 46 that are registers for the connection management of the device on the data input side. The oPCR 45 is constructed of an oPCR[0] 51, an oPCR[1] 52 and so forth, which are registers corresponding to one of the channels for the isochronous data transfer respectively. The iPCR 46 is also constructed of an iPCR[0] 53, an iPCR[1] 54 and so forth, which are registers corresponding to one of the channels for the isochronous data transfer respectively.

Figure 4:
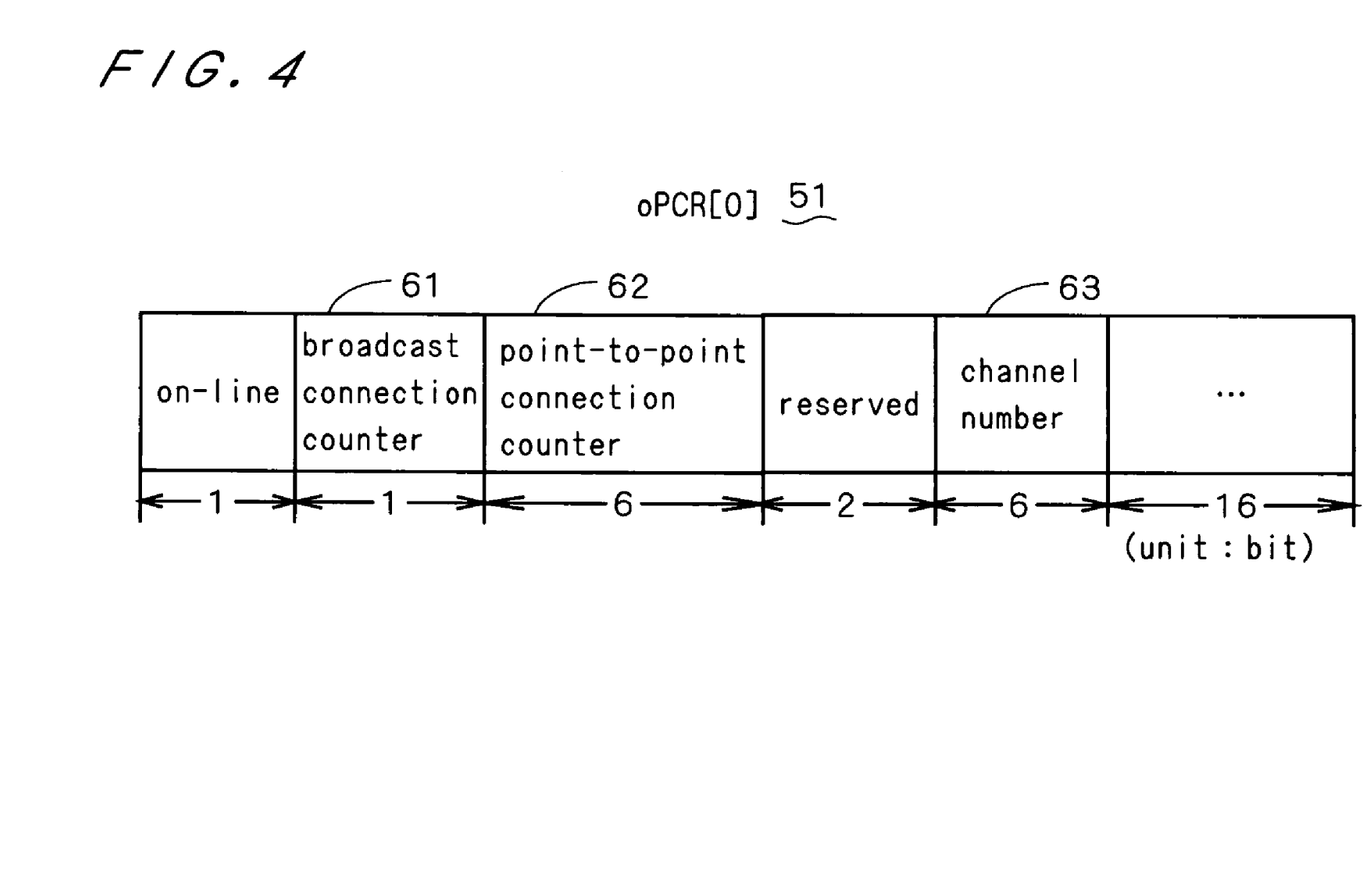
FIG. 4 is a diagram showing the data format of oPCR[0] in FIG. 3.
Figure 5:
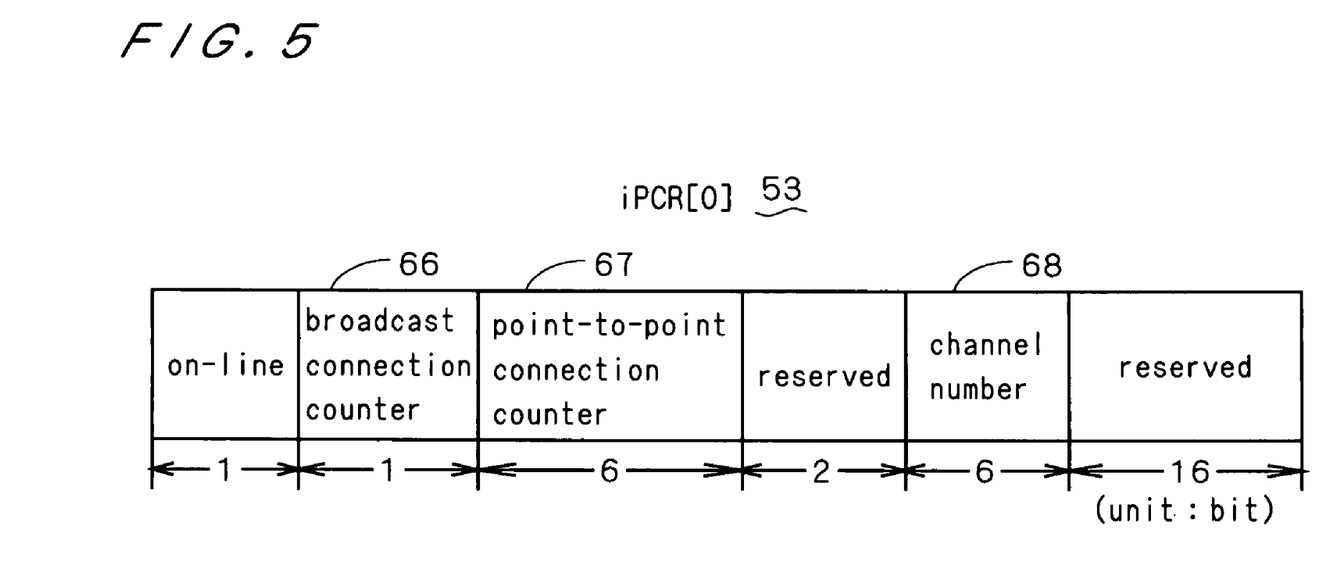
FIG. 5 is a diagram showing the data format of iPCR[0] in FIG. 3.

The data format of the oPCR[0] 51 and the iPCR[0] 53 in FIG. 3 will be described next with reference to FIGS. 4 and 5. As shown in FIG. 4, the oPCR[0] 51 is constructed of the data areas such as a broadcast connection counter 61 that is incremented when executing data transmission by a broadcast connection, a point-to-point connection counter 62 that is incremented when executing data transmission by the point-to-point connection, a channel number 63 that memorizes the channel number used in executing data transmission on the bus 3 and so forth. Moreover, as shown in FIG. 5, the iPCR[0] 53 is constructed of the data areas such as a broadcast connection counter 66 that is incremented when executing data reception by the broadcast connection, a point-to-point connection counter 67 that is incremented when executing data reception by the point-to-point connection, a channel number 68 that memorizes the channel number used in executing data reception from the sending device 2 on the bus 3 and so forth.

Figure 6:
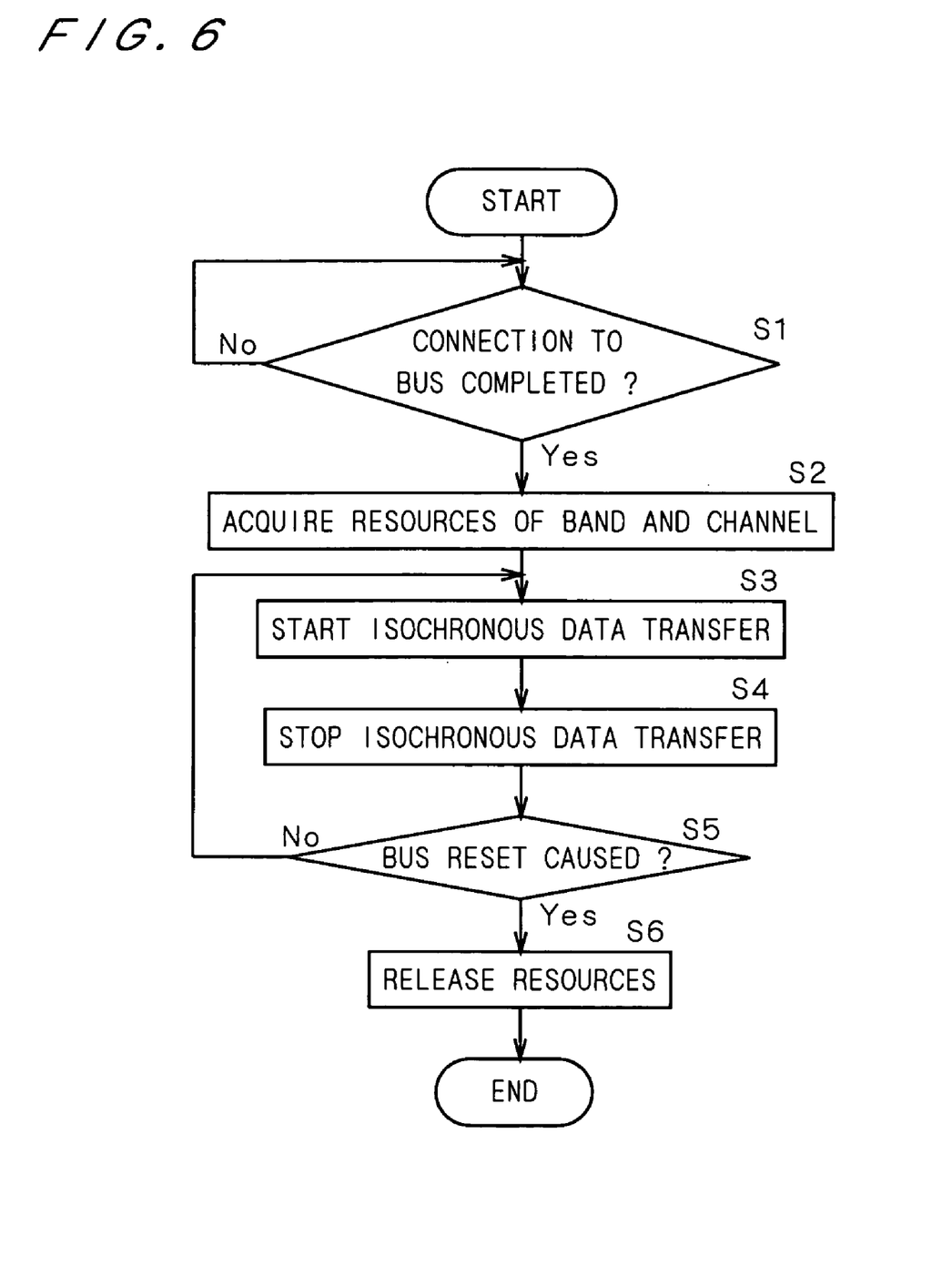
FIG. 6 is a flow chart showing resources acquisition processing and resources release processing in the above receiving device.

The resources acquisition processing and the resources release processing in performing the isochronous data transfer from the sending device 2 to the receiving device 1 will be described next with reference to FIG. 6. When the physical connection between the receiving device 1 and the sending device 2 via the bus 3 is completed and the bus manager 31 (see FIG. 2) of the bus management node on the bus 3 transmits a bus reset completion signal to the receiving device 1, the processor 11 of the receiving device 1 receives this signal via the bus 3 and the I/F board 10 and confirms that the connection of the receiving device 1 to the bus 3 has been completed (S1). When this confirmation ends (YES at S1), the processor 11 of the receiving device 1 increments the point-to-point connection counter 67 (see FIG. 5) in the iPCR[0] 53 of the I/F board 10 by one. Then, the processor 11 makes an access to the isochronous resource management node (the sending device 2 in the example of FIG. 2) on the bus 3 via the bus 3 and the I/F board 10 to update the contents of the BANDWIDTH_AVAILABLE 42 (see FIG. 3) and the contents of the CHANNELS_AVAILABLE HI 43 or the CHANNELS_AVAILABLE LO 44 (see FIG. 3) included in the bus management CSR 36 of the isochronous resource management node and acquires the resources of the band and the channel for the the isochronous data transfer (S2).

When the resources acquisition ends, the processor 11 of the receiving device 1 sends a control command to start data transmission to the sending device 2 via the bus 3 and the I/F board 10. Upon receiving this control command via the bus 3 and the I/F board 20, the processor 21 of the sending device 2 starts the isochronous data transfer to the receiving device 1 (S3). Then, even if the processor 21 of the sending device 2 stops the isochronous data transfer (S4), the processor 11 of the receiving device 1 does not release the resources of the band and the channel for the isochronous data transfer and keeps securing the resources until the bus reset is caused again. When the bus reset is caused again (YES at S5), the resources release is executed by the isochronous resource manager 32 (see FIG. 2) at the isochronous resource management node (S6).

As described above, according to the receiving device 1 of the present embodiment, the processor 11 does not execute the acquisition and release of the resources of the band and the channel for the isochronous data transfer every time it receives data from the sending device 2 by the isochronous transfer, but the acquisition of the resources of the band and the channel for the isochronous data transfer via the bus 3 and the I/F board 10 only when the completion of the bus reset is detected and holds the resources until the next bus reset is caused. By this processing, the receiving device 1 can consistently secure the resources necessary for the isochronous data transfer to the sending device 2 so long as the acquisition of the resources at the time of the completion of the bus reset is successfully achieved. This therefore enables the prevention of the occurrence of a situation in which the receiving device 1 becomes unable to receive the data from the sending device 2 by the isochronous transfer due to a resource shortage caused by having failed in releasing the resources when the receiving device 1 stopped the isochronous data transfer previously.

The present invention is not limited to the aforementioned embodiment, and a variety of modifications are possible. For example, although the example in which both of the bus management node and the isochronous resource management node exist among the nodes on the bus 3 has been described in the present embodiment, the bus management node is not required to exist among the nodes on the bus 3. Moreover, although the example in which the sending device 2 plays the roles of both of the bus management node and the isochronous resource management node is shown in FIG. 2 of the aforementioned embodiment, the device connected to the bus 3 other than the sending device 2 may be the bus management node or the isochronous resource management node.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A receiving device connected to an IEEE1394 serial bus comprising:
   an IEEE1394 digital interface board for transmitting and receiving data via the IEEE1394 serial bus; and
   a processor for controlling the IEEE1394 digital interface board; wherein
   the IEEE1394 digital interface board is able to receive data from a sending device connected by point-to-point connection by isochronous transfer; and
   instead of acquiring resources of a band and a channel for isochronous data transfer every time the IEEE1394 digital interface board receives the data transmitted from the sending device by the isochronous transfer, the processor acquires the resources of the band and the channel for the isochronous data transfer via the IEEE1394 serial bus and the IEEE1394 digital interface board only when a bus reset is caused, and holds the resources until a next bus reset is caused.

2. The receiving device connected to the IEEE1394 serial bus according to claim 1, wherein a timing for acquiring the resources of the band and the channel by the processor is after reception of a bus reset completion signal transmitted from a bus manager on the IEEE1394 serial bus.

3. The receiving device connected to the IEEE1394 serial bus according to claim 2, wherein the receiving device is a device such as a printer, which consistently establishes the point-to-point connection with the sending device and receives data from the sending device by the isochronous transfer.

4. The receiving device connected to the IEEE1394 serial bus according to claim 3, wherein an isochronous resource management node exists as a device (node) that manages the band and the channel for the isochronous data transfer among devices connected to the IEEE1394 serial bus, and
   the processor acquires the resources of the band and the channel for the isochronous data transfer by making an access to the isochronous resource management node via the IEEE1394 digital interface board upon receiving the bus reset completion signal transmitted from the bus manager.

5. The receiving device connected to the IEEE1394 serial bus according to claim 2, wherein an isochronous resource management node exists as a device (node) that manages the band and the channel for the isochronous data transfer among devices connected to the IEEE1394 serial bus, and
   the processor acquires the resources of the band and the channel for the isochronous data transfer by making an access to the isochronous resource management node via the IEEE1394 digital interface board upon receiving the bus reset completion signal transmitted from the bus manager.

6. The receiving device connected to the IEEE1394 serial bus according to claim 1, wherein the receiving device is a device such as a printer, which consistently establishes the point-to-point connection with the sending device and receives data from the sending device by the isochronous transfer.

7. The receiving device connected to the IEEE1394 serial bus according to claim 6, wherein an isochronous resource management node exists as a device (node) that manages the band and the channel for the isochronous data transfer among devices connected to the IEEE1394 serial bus, and
   the processor acquires the resources of the band and the channel for the isochronous data transfer by making an access to the isochronous resource management node via the IEEE1394 digital interface board upon receiving the bus reset completion signal transmitted from the bus manager.

8. The receiving device connected to the IEEE1394 serial bus according to claim 1, wherein an isochronous resource management node exists as a device (node) that manages the band and the channel for the isochronous data transfer among devices connected to the IEEE1394 serial bus, and
   the processor acquires the resources of the band and the channel for the isochronous data transfer by making an access to the isochronous resource management node via the IEEE1394 digital interface board upon receiving the bus reset completion signal transmitted from the bus manager.

* * * * *